United States Patent
Lee et al.

(10) Patent No.: US 12,431,536 B2
(45) Date of Patent: Sep. 30, 2025

(54) ELECTROLYTE FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Junyong Lee, Yongin-si (KR); Pavel Shatunov, Yongin-si (KR); Soojin Kim, Yongin-si (KR); Injun Park, Yongin-si (KR); Tae Jin Lee, Yongin-si (KR); Hyejeong Jeong, Yongin-si (KR); Hyunbong Choi, Yongin-si (KR); Jungmin Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 433 days.

(21) Appl. No.: 18/007,734

(22) PCT Filed: Apr. 30, 2021

(86) PCT No.: PCT/KR2021/005498
§ 371 (c)(1),
(2) Date: Dec. 1, 2022

(87) PCT Pub. No.: WO2021/256700
PCT Pub. Date: Dec. 23, 2021

(65) Prior Publication Data
US 2023/0238578 A1    Jul. 27, 2023

(30) Foreign Application Priority Data
Jun. 15, 2020   (KR) .................... 10-2020-0072233

(51) Int. Cl.
*H01M 10/0567*   (2010.01)
*H01M 4/505*   (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ................................. H01M 10/0567
See application file for complete search history.

(56) References Cited

U.S. PATENT DOCUMENTS 9,748,605 B2 *   8/2017   Schmidt ............ H01M 10/0567
9,774,057 B2 *   9/2017   Schroedle ......... H01M 10/0567
(Continued)

FOREIGN PATENT DOCUMENTS

CN    110563764 A    12/2019
JP    2011-108454 A    6/2011
(Continued)

OTHER PUBLICATIONS

Korean Office Action dated Aug. 30, 2024, issued in Korean Patent Application No. 10-2020-0072233, 5 pages.
(Continued)

*Primary Examiner* — Jonathan Johnson
(74) *Attorney, Agent, or Firm* — Womble Bond Dickinson (US) LLP

(57) ABSTRACT

Provided is an electrolyte for a lithium secondary battery, the electrolyte including a non-aqueous organic solvent, a lithium salt, and an additive, wherein the additive includes a compound represented by Chemical Formula 1.

[Chemical Formula 1]

(Continued)

The definitions of each of the substituents in Chemical Formula 1 are as set forth in the detailed description.

11 Claims, 5 Drawing Sheets

(51) Int. Cl.
  *H01M 4/525* (2010.01)
  *H01M 10/0525* (2010.01)
  *H01M 10/0568* (2010.01)
  *H01M 4/02* (2006.01)
(52) U.S. Cl.
  CPC ... *H01M 10/0525* (2013.01); *H01M 10/0568* (2013.01); *H01M 2004/028* (2013.01); *H01M 2300/0025* (2013.01)

(56) References Cited

U.S. PATENT DOCUMENTS

| | | |
|---|---|---|
| 9,847,549 B2 | 12/2017 | Lee et al. |
| 11,050,087 B2 * | 6/2021 | Moganty ............ H01M 10/0569 |
| 2003/0036001 A1 * | 2/2003 | James ...................... H01G 4/12 |
| | | 429/232 |
| 2009/0068562 A1 * | 3/2009 | Yew .................. H01M 10/0567 |
| | | 429/324 |
| 2009/0191465 A1 * | 7/2009 | Hwang ................. H01M 4/386 |
| | | 252/62.2 |
| 2013/0004862 A1 | 1/2013 | Miyoshi et al. |
| 2014/0178748 A1 | 6/2014 | Chernyshov et al. |
| 2014/0272604 A1 | 9/2014 | Lim et al. |
| 2018/0090756 A1 * | 3/2018 | Yoo ......................... C22C 22/00 |
| 2018/0248226 A1 | 8/2018 | Kono et al. |
| 2019/0198924 A1 | 6/2019 | Kim et al. |
| 2019/0207258 A1 | 7/2019 | Kim et al. |
| 2021/0273263 A1 | 9/2021 | Kozel et al. |

FOREIGN PATENT DOCUMENTS

| | | | |
|---|---|---|---|
| JP | 2012-064472 | A | 3/2012 |
| JP | 2014-123560 | A | 7/2014 |
| JP | 2014-165180 | A | 9/2014 |
| KR | 10-2006-0071761 | A | 6/2006 |
| KR | 10-2013-0018238 | A | 2/2013 |
| KR | 10-2014-0067242 | A | 6/2014 |
| KR | 10-2014-0081468 | A | 7/2014 |
| KR | 10-2014-0104383 | A | 8/2014 |
| KR | 10-2015-0050149 | A | 5/2015 |
| KR | 10-2018-0027996 | A | 3/2018 |
| KR | 10-2018-0027997 | A | 3/2018 |
| KR | 10-2019-0123136 | A | 10/2019 |
| WO | 2020/007425 | A1 | 1/2020 |

OTHER PUBLICATIONS

International Search Report of PCT/KR2021/005498, Aug. 5, 2021, 4 pp.
Tworowska, et al., "The phosphorofluoroamidite approach to mixed phosphites," Journal of Organometallic Chemistry, vol. 643-644, Feb. 1, 2002, pp. 490-493.
Japanese Office Action dated Oct. 23, 2023, issued in corresponding Japanese Patent Application No. 2022-568901 (4 pages).
Chinese Office Action for CN Application No. 202180036712.7, dated Jul. 25, 2025, 6 pages.

* cited by examiner

ELECTROLYTE FOR LITHIUM SECONDARY BATTERY AND LITHIUM SECONDARY BATTERY COMPRISING SAME

CROSS-REFERENCE TO RELATED APPLICATIONS

This application is a U.S. National Phase Patent Application of International Application Number PCT/KR2021/005498, filed on Apr. 30, 2021, which claims priority of Korean Patent Application Number 10-2020-0072233, filed on Jun. 15, 2020, the entire content of each of which is incorporated herein by reference.

TECHNICAL FIELD

An electrolyte for a lithium secondary battery and a lithium secondary battery including the same are related.

BACKGROUND ART

A lithium secondary battery may be recharged and has three or more times as high energy density per unit weight as a conventional lead storage battery, nickel-cadmium battery, nickel hydrogen battery, nickel zinc battery and the like and may be also charged at a high rate and thus, is commercially manufactured for a laptop, a cell phone, an electric tool, an electric bike, and the like, and researches on improvement of additional energy density have been actively made.

Such a lithium secondary battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

Particularly, an electrolyte includes an organic solvent in which a lithium salt is dissolved and critically determines stability and performance of a lithium secondary battery.

$LiPF_6$ that is most commonly used as a lithium salt of an electrolyte has a problem of reacting with an electrolytic solvent to promote depletion of a solvent and generate a large amount of gas. When $LiPF_6$ is decomposed, it generates LiF and $PF_5$, which leads to electrolyte depletion in the battery, resulting in degradation in high-temperature performance and poor safety.

There are needs for an electrolyte which suppresses side reactions of such a lithium salt and improves the performance of the battery.

DISCLOSURE

Technical Problem

An embodiment is to provide an electrolyte for a lithium secondary battery having improved battery performance due to excellent high-temperature stability and cycle-life characteristics.

Another embodiment is to provide a lithium secondary battery including the electrolyte for a lithium secondary battery.

Technical Solution

An embodiment provides an electrolyte for a lithium secondary battery including a non-aqueous organic solvent, a lithium salt, and an additive, wherein the additive includes a compound represented by Chemical Formula 1.

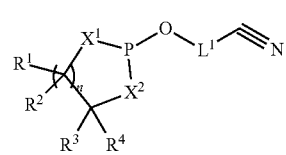

[Chemical Formula 1]

In Chemical Formula 1,
$X^1$ and $X^2$ are each independently O, S, $CR^aR^b$, or $NR^c$, provided that at least one of $X^1$ and $X^2$ is O or S,
$L^1$ is a substituted or unsubstituted C1 to C10 alkylene group or a substituted or unsubstituted C2 to C10 alkenylene group,
$R^1$ to $R^4$ are each independently hydrogen, a C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C6 to C20 an aryl group, or a combination thereof, and
n is an integer of any one of 1 to 3.

The compound represented by Chemical Formula 1 may be represented by Chemical Formula 1A.

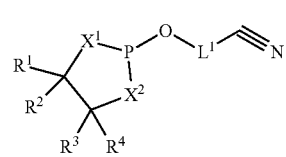

[Chemical Formula 1A]

In Chemical Formula 1A,
the definitions of $X^1$, $X^2$, $L^1$, and $R^1$ to $R^4$ are as described above.

The compound represented by Chemical Formula 1 may be represented by any one of Chemical Formula 1-1 to Chemical Formula 1-3.

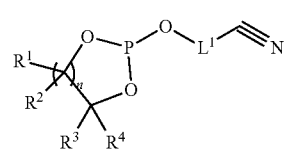

[Chemical Formula 1-1]

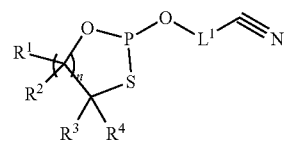

[Chemical Formula 1-2]

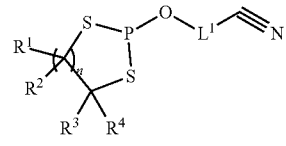

[Chemical Formula 1-3]

In Chemical Formula 1-1 to Chemical Formula 1-3,
the definitions of $L^1$, $R^1$ to $R^4$, and n are as described above.

$R^1$ to $R^4$ may each independently be hydrogen, a C1 to C6 alkyl group, a substituted or unsubstituted C1 to C6 alkoxy group, a substituted or unsubstituted C2 to C6 alkenyl group, a substituted or unsubstituted C3 to C6 cycloalkyl group, a substituted or unsubstituted C3 to C6 cycloalkenyl group, a substituted or unsubstituted C6 to C10 an aryl group, or a combination thereof.

$L^1$ may be a substituted or unsubstituted C1 to C6 alkylene group.

The compound represented by Chemical Formula 1 may be represented by any one of Chemical Formula 1-a to Chemical Formula 1-r.

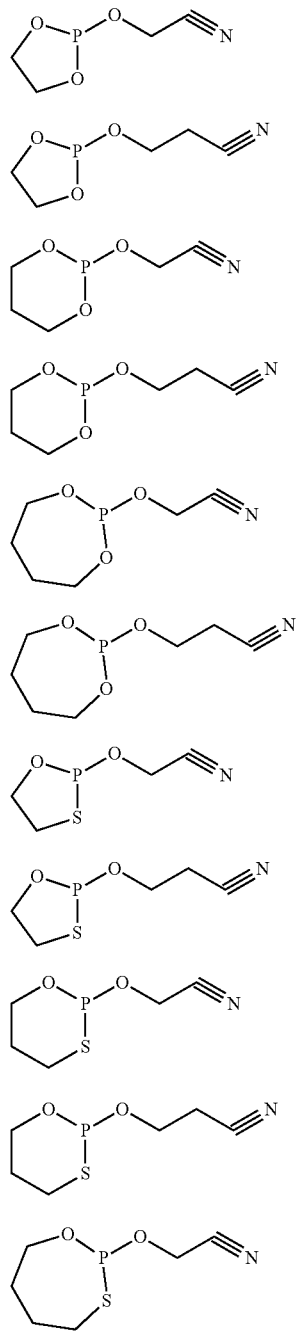

[1-a]
[1-b]
[1-c]
[1-d]
[1-e]
[1-f]
[1-g]
[1-h]
[1-i]
[1-j]
[1-k]

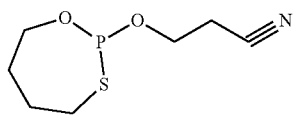

[1-l]

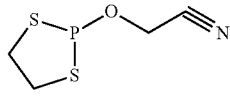

[1-m]

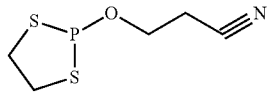

[1-n]

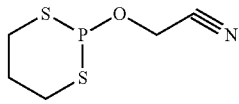

[1-o]

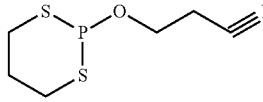

[1-p]

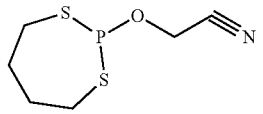

[1-q]

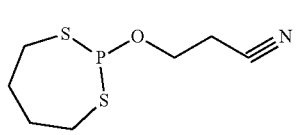

[1-r]

The compound represented by Chemical Formula 1 may be included in an amount of 0.1 wt % to 10 wt % based on the total amount of the electrolyte for a lithium secondary battery.

The compound represented by Chemical Formula 1 may be included in an amount of 0.1 wt % to 3.0 wt % based on the total amount of the electrolyte for a lithium secondary battery.

Another embodiment provides a lithium secondary battery including a positive electrode including a positive active material, a negative electrode including a negative active material, and the aforementioned electrolyte.

The positive active material may be represented by Chemical Formula 2.

$$Li_aNi_{x1}Co_{y1}M_{z1}O_2 \qquad \text{[Chemical Formula 2]}$$

In Chemical Formula 2, $0.9 \leq a \leq 1.8$, $0.5 \leq x1 \leq 1$, $0 < y1 \leq 0.5$, $0 < z1 \leq 0.5$, $x1+y1+z1=1$, and M is Ni, Co, Mn, Al, Ti, Mg, Zr, Ca, Nb, Fe, P, F, B, or a combination thereof.

The positive active material may include at least one of a composite oxide of lithium and a metal selected from cobalt, manganese, nickel, and a combination thereof.

Advantageous Effects

A lithium secondary battery with improved high-temperature stability, chemical resistance, and cycle-life characteristics may be implemented.

DESCRIPTION OF SYMBOLS

Figure 1:
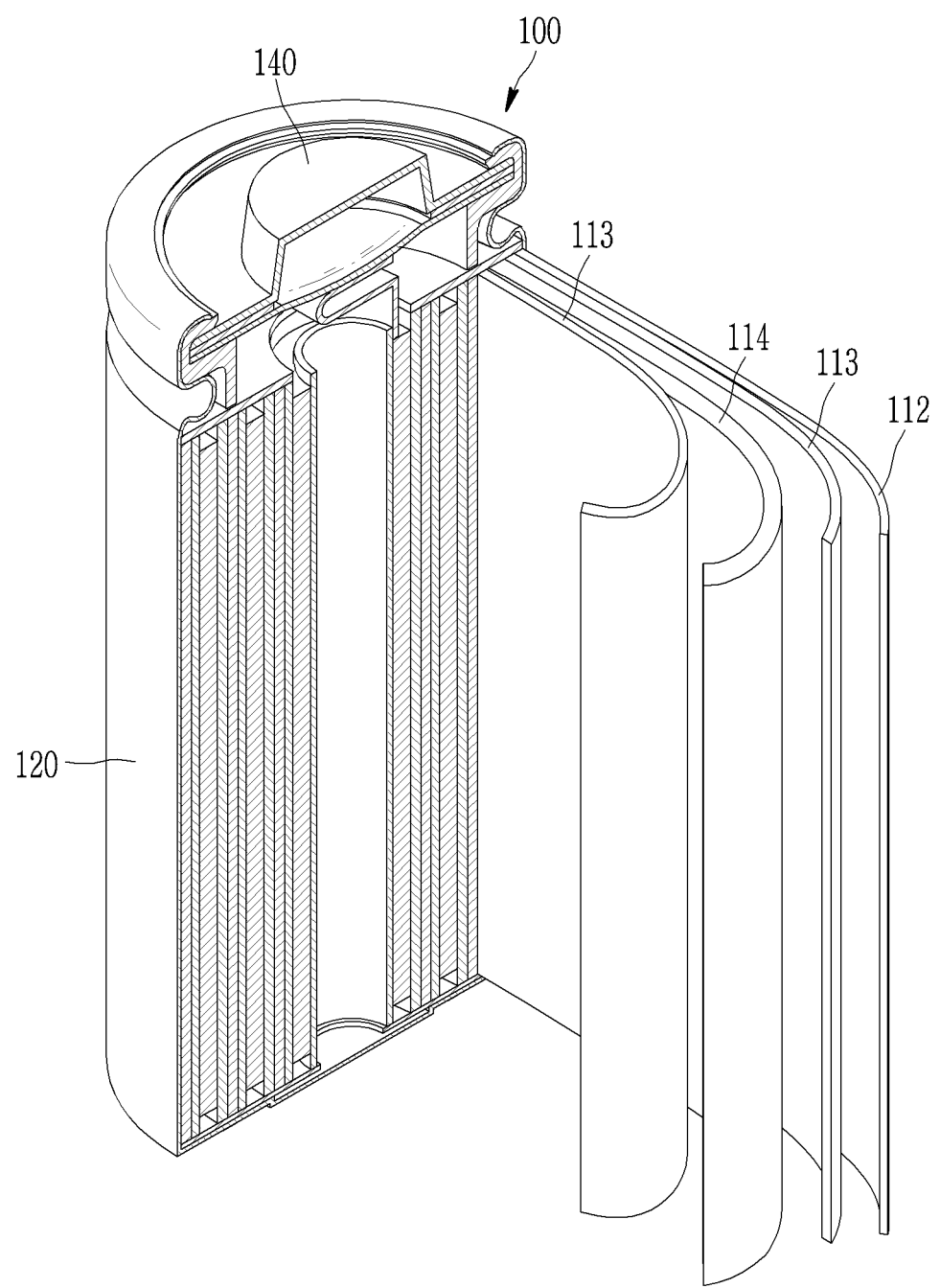
FIG. 1 is a schematic view of a lithium secondary battery according to an embodiment of the present invention.

100: lithium secondary battery
112: negative electrode
113: separator
114: positive electrode
120: battery case
140: sealing member

MODE FOR INVENTION

Hereinafter, embodiments of the present invention are described. However, these embodiments are exemplary, the present invention is not limited thereto and the present invention is defined by the scope of claims.

In the present specification, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an electrolyte for a lithium secondary battery according to an embodiment is described.

An electrolyte for a lithium secondary battery according to an embodiment includes a non-aqueous organic solvent, a lithium salt, and an additive, wherein the additive includes a compound represented by Chemical Formula 1.

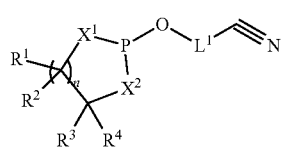

[Chemical Formula 1]

In Chemical Formula 1, $X^1$ and $X^2$ are each independently O, S, $CR^aR^b$, or $NR^c$, provided that at least one of $X^1$ and $X^2$ is O or S, $L^1$ is a substituted or unsubstituted C1 to C10 alkylene group or a substituted or unsubstituted C2 to C10 alkenylene group, $R^1$ to $R^4$ are each independently hydrogen, a C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C6 to C20 an aryl group, or a combination thereof, and n is an integer of any one of 1 to 3.

Meanwhile, when n is 2 or 3, at least two $R^1$ or at least two $R^2$ may be the same or different.

The compound represented by Chemical Formula 1 included as an additive according to an embodiment contains a cyano group (—CN) and a cyclic phospholane-based functional group simultaneously in one molecule.

The compound may be decomposed in an electrolyte and form a film in the form of a lithium salt on the surfaces of the positive and negative electrodes and thus exhibit effects of reducing initial resistance, suppressing a high-temperature storage resistance increase rate, and reducing gas generation.

Specifically, the lithium salt including a cyclic phosphone-based functional group includes an O—Li bond instead of the O-$L^1$ bond in Chemical Formula 1, wherein the lithium salt may move toward the positive electrode and form a film of the surface of the positive electrode.

Particularly, the cyclic phosphone-based functional group has a lower oxidation potential than that of the linear phosphone-based functional group and may be oxidatively decomposed and thus form a firm polyphosphate film on the surface of the positive electrode, contributing to improving high-temperature performance of a cell.

On the other hand, the cyano group (—CN) included at the terminal end of the compound represented by Chemical Formula 1 reacts with Cu to ionize the Cu surface or polymerize itself to prevent generation of Cu-containing impurities and thus stop a voltage drop caused by the Cu-containing impurities, improving cell defect rates.

For example, the compound may be represented by at least one of Chemical Formula 1A to Chemical Formula 1C.

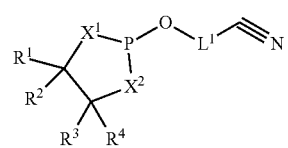

[Chemical Formula 1A]

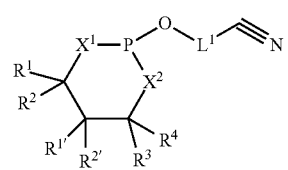

[Chemical Formula 1B]

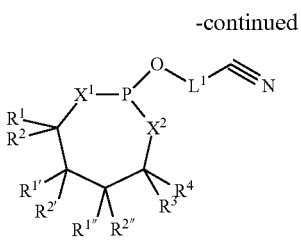

[Chemical Formula 1C]

In Chemical Formula 1A to Chemical Formula 1C, the definitions of $X^1$, $X^2$, and $R^1$ to $R^4$ are as described above, and the definitions of $R^{1'}$, $R^{1''}$, $R^{2'}$, and $R^{2''}$ are the same as those of $R^1$ and $R^2$ described above.

In an embodiment, the compound may be represented by Chemical Formula 1A or Chemical Formula 1B, and in another embodiment, it may be represented by Chemical Formula 1A.

In addition, the compound represented by Chemical Formula 1 may be represented by any one of Chemical Formula 1-1 to Chemical Formula 1-3.

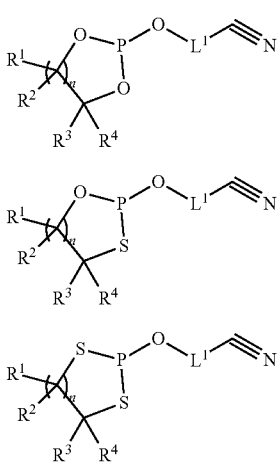

[Chemical Formula 1-1]

[Chemical Formula 1-2]

[Chemical Formula 1-3]

In Chemical Formula 1-1 to Chemical Formula 1-3, the definitions of $L^1$, $R^1$ to $R^4$, and n are as described above.

In an embodiment, the compound may be represented by Chemical Formula 1-1 or Chemical Formula 1-2, and in another embodiment, it may be represented by Chemical Formula 1-1.

In an embodiment, n in Chemical Formulas 1-1 to 1-3 may be 1 or 2, and in another embodiment, n may be 1.

In an embodiment, $R^1$ to $R^4$ of the compound represented by Chemical Formula 1 may each independently be hydrogen, a C1 to C6 alkyl group, a substituted or unsubstituted C1 to C6 alkoxy group, a substituted or unsubstituted C2 to C6 alkenyl group, a substituted or unsubstituted C3 to C6 cycloalkyl group, a substituted or unsubstituted C3 to C6 cycloalkenyl group, a substituted or unsubstituted C6 to C10 an aryl group, or a combination thereof, in another embodiment, $R^1$ to $R^4$ may be hydrogen, a methyl group, an ethyl group, a propyl group, a butyl group, an isopropyl group, a tert-butyl group, a 2,2-dimethylpropyl group, a methoxy group, an ethoxy group, an ethenyl group, a propenyl group, a butenyl group, a cyclopropyl group, a cyclobutyl group, a cyclopentyl group, a cyclohexyl group, a phenyl group, a tolyl group, a xylene group, a benzyl group, or a combination thereof.

The compound represented by Chemical Formula 1 may be, for example, included in an amount of greater than or equal to 0.1 wt %, greater than or equal to 0.5 wt %, greater than or equal to 1 wt %, greater than or equal to 2 wt %, greater than or equal to 3 wt %, greater than or equal to 4 wt %, or greater than or equal to 5 wt %, and less than or equal to 10 wt %, less than or equal to 9 wt %, less than or equal to 8 wt %, less than or equal to 7 wt %, or less than or equal to 6 wt % based on the total amount of the electrolyte for a lithium secondary battery.

When the content range of the compound represented by Chemical Formula 1 is as described above, it is possible to implement a lithium secondary battery with improved cycle-life characteristics by preventing an increase in resistance at a high temperature and suppressing gas generation.

That is, when the content of the compound represented by Chemical Formula 1 is less than 0.1 wt %, high-temperature storage characteristics may be lowered, and when it exceeds 10 wt %, cycle-life may be reduced due to an increase in interfacial resistance.

Specifically, the compound represented by Chemical Formula 1 may be a compound represented by any one of Chemical Formula 1-a to Chemical Formula 1-r, but is not limited thereto.

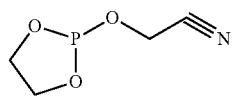

[1-a]

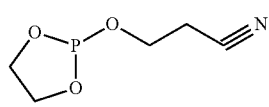

[1-b]

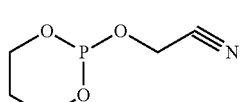

[1-c]

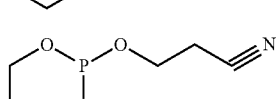

[1-d]

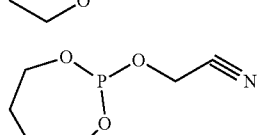

[1-e]

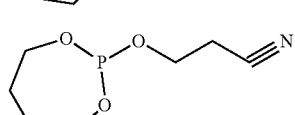

[1-f]

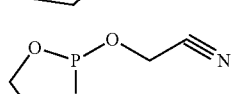

[1-g]

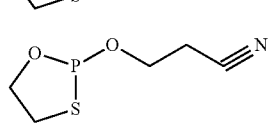

[1-h]

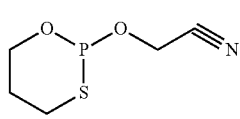

[1-i]

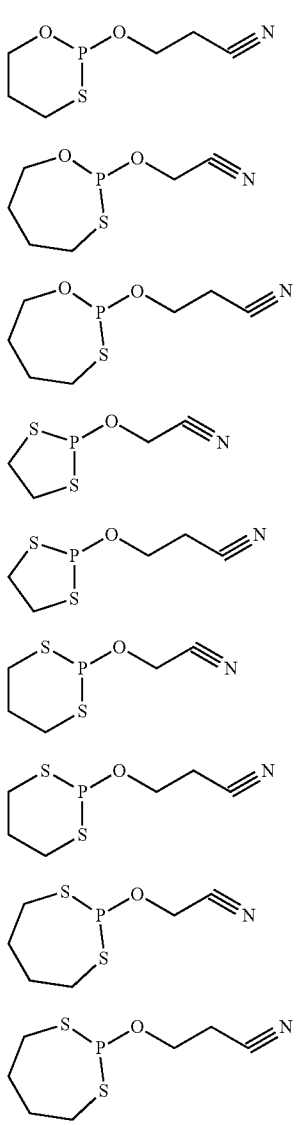

[1-j]

[1-k]

[1-l]

[1-m]

[1-n]

[1-o]

[1-p]

[1-q]

[1-r]

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, propylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may include cyclohexanone, and the like. The alcohol-based solvent may include ethanol, isopropyl alcohol, and the like and the aprotic solvent may include nitriles such as R—CN (wherein R is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture and when the organic solvent is used in a mixture, the mixture ratio may be controlled in accordance with a desirable battery performance.

In addition, the carbonate-based solvent is prepared by mixing a cyclic carbonate and a linear carbonate. When the cyclic carbonate and linear carbonate are mixed together in a volume ratio of 1:1 to 1:9, an electrolyte performance may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

[Chemical Formula 3]

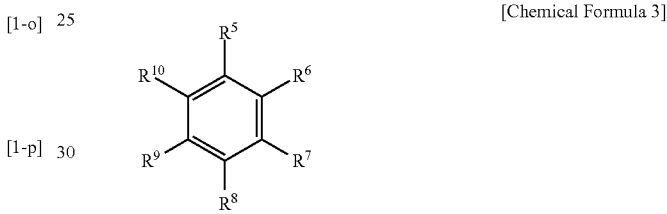

In Chemical Formula 3, $R^5$ to $R^{10}$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 4 in order to improve cycle-life of a battery.

[Chemical Formula 4]

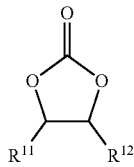

In Chemical Formula 4, $R^{11}$ and $R^{12}$ are the same or different and selected from hydrogen, a halogen, a cyano group (CN), a nitro group ($NO_2$), and a fluorinated C1 to C5 alkyl group, provided that at least one of $R^{11}$ and $R^{12}$ is a halogen, a cyano group (CN), a nitro group ($NO_2$), and a fluorinated C1 1 to C5 alkyl group and $R^{11}$ and $R^{12}$ are not simultaneously hydrogen.

Examples of the ethylene-based carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-organic solvent supplies lithium ions in a battery, enables a basic operation of a lithium secondary battery, and improves transportation of the lithium ions between positive and negative electrodes. Examples of the lithium salt may include one or two or more selected $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI, and $LiB(C_2O_4)_2$ (lithium bis(oxalato) borate, LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment provides a lithium secondary battery including a positive electrode including a positive active material; a negative electrode including a negative active material; and the aforementioned electrolyte.

The positive electrode includes a current collector and a positive active material layer disposed on the current collector and including a positive active material.
The positive active material may include lithiated intercalation compounds that reversibly intercalate and deintercalate lithium ions.

Specifically, at least one composite oxide of lithium and a metal of cobalt, manganese, nickel, or a combination thereof may be used.

Examples of the positive active material may be a compound represented by one of chemical formulae.

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}D_\alpha$ ($0.90 \le a \le 1.8$, $0 \le b \le 0.5$, $0 \le c \le 0.05$, $0 \le \alpha \le 2$); $Li_aNi_{1-b-c}Co_bX_cO_{2-\alpha}T_2$ ($0.90 \le a \le 1.8$, $0 \le b \le 0.5$, $0 \le c \le 0.05$, $0 \le \alpha \le 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$)

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method (e.g., spray coating, dipping, etc.), but is not illustrated in more detail since it is well-known to those skilled in the related field.

According to an embodiment, the positive active material may be represented by Chemical Formula 5.

$Li_aNi_{x1}Co_{y1}M_{z1}O_2$      [Chemical Formula 5]

In Chemical Formula 5,
$0.9 \le a \le 1.8$, $0.5 < x1 \le 1$, $0 < y1 \le 0.5$, $0 < z1 \le 0.5$, $x1+y1+z1=1$, and M is Ni, Co, Mn, Al, Ti, Mg, Zr, Ca, Nb, Fe, P, F, B, or a combination thereof.

In the positive electrode, a content of the positive active material may be 90 wt % to 98 wt % based on the total weight of the positive active material layer.

In an embodiment of the present invention, the positive active material layer may include a binder and a conductive material. Herein, each content of the binder and the conductive material may be 1 wt % to 5 wt %, based on the total amount of the positive active material layer.

The binder improves binding properties of positive active material particles with one another and with a current collector and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

The negative electrode includes a current collector and a negative active material layer formed on the current collector and including a negative active material.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include a carbon material. The carbon material may be any generally-used carbon-based negative active material in a lithium ion secondary battery and examples thereof may be crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, calcined coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, Si—C composite, $SiO_x$ (0<x<2), a Si-Q alloy wherein Q is an element selected from an alkali metal, an alkaline-earth metal, a Group 13 element, a Group 14 element, a Group 15 element, a Group 16 element, a transition metal, a rare earth element, and a combination thereof, but not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of 95 wt % to 99 wt % based on the total weight of the negative active material layer.

In an embodiment of the present invention, the negative active material layer includes a binder, and optionally a conductive material. In the negative active material layer, a content of the binder may be 1 wt % to 5 wt % based on the total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, ethylenepropylenecopolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as a negative electrode binder, a cellulose-based compound as a thickener may be further used to provide viscosity. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 to 3 parts by weight based on 100 parts by weight of the negative active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The lithium secondary battery may further include a separator between the negative electrode and the positive electrode, depending on a type of the lithium secondary battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Referring to FIG. 1, a lithium secondary battery 100 according to an embodiment includes a battery cell including a negative electrode 112, a positive electrode 114 facing the negative electrode 112, a separator 113 interposed between the negative electrode 112 and the positive electrode 114, and an electrolyte 113 (not shown) for a lithium secondary battery impregnating the negative electrode 112, the positive electrode 114, and the separator 113, a battery case 120 housing the battery cell, and a sealing member 140 sealing the battery case 120.

Hereinafter, examples of the present disclosure and comparative examples are described. These examples, however, are not in any sense to be interpreted as limiting the scope of the invention.

Manufacture of Lithium Secondary Battery Cell

Synthesis Example 1: Synthesis of Compound Represented by Chemical Formula 1-b

A solution prepared by dissolving 3-hydroxypropionitrile (14.22 g; 0.20 mol) and triethylamine (22.26 g; 0.22 mol) in 200 ml of anhydrous toluene was added to a solution prepared by dissolving 2-chloro-1,3,2-dioxaphospholane (25.30 g; 0.20 mol) in 200 ml of anhydrous toluene and then, stirred with a magnetic stirrer at 0° C. for 30 minutes. Subsequently, the mixed solution was left stirred for about 15 hours. Then, the solution was filtered to separate white precipitates, and the precipitates on the filter were washed with a small amount of anhydrous toluene. After mixing the filtered solution with the washed solution, the solution was rotary-evaporated to remove the solvent (toluene). The remaining yellowish oil was fractionally distilled under a reduced pressured to obtain a slightly yellowish syrup product represented by Chemical Formula 1-b. A yield of the compound represented by Chemical Formula 1-b was about 61.8%, and a boiling point (b.p.) thereof at 1 Torr was about 115° C.

[Chemical Formula 1-b]

$^1$H NMR (400 MHz, CDCl$_3$, 25° C.): δ 4.15 (m, 2H, OCH$_2$CH$_2$O), 3.95 (m, 2H, OCH$_2$CH$_2$O), 3.88 (m, 2H, OCH$_2$CH$_2$CN), 2.55 (t, 2H, J1=6.0 Hz, J2=6.4 Hz, OCH$_2$CH$_2$CN). $^{13}$C NMR (101 MHz, CDCl$_3$, 25° C.): δ 117.38 (CN), 64.31 (d, JCP=9.6 Hz, OCH$_2$CH$_2$O), 57.46 (d, JCP=15.3 Hz, OCH$_2$CH$_2$CN), 20.53 (d, JCP=4.8 Hz, OCH$_2$CH$_2$CN). $^{31}$P NMR (162 MHz, CDCl$_3$, 25° C.): δ 134.91.

Example 1: Manufacture of Lithium Secondary Battery Cell

Positive active material slurry was prepared by mixing Li[Ni$_{0.88}$Co$_{0.105}$Al$_{0.015}$]O$_2$ as a positive active material, polyvinylidene fluoride as a binder, and carbon black as a conductive material in a weight ratio of 98:1:1 and dispersing the mixture in N-methyl pyrrolidone.

The positive active material slurry was coated on a 20 μm-thick Al foil, dried at 100° C., and pressed to manufacture a positive electrode.

Negative active material slurry was prepared by mixing graphite as a negative active material, styrene-butadiene as a rubber binder, and carboxylmethyl cellulose in a weight ratio of 98:1:1 and dispersing the mixture in distilled water.

The negative active material slurry was coated on a 10 μm-thick Cu foil, dried at 100° C., and pressed to manufacture a negative electrode.

The positive and negative electrodes were used with a 25 μm-thick polyethylene separator and an electrolyte to manufacture a lithium secondary battery cell.

The electrolyte has the following composition.
(Composition of Electrolyte)
Salt: 1.5 M LiPF$_6$
Solvent: ethylene carbonate, ethylmethyl carbonate, and dimethyl carbonate were added in a volume ratio of 2:2:6 (EC:EMC:DMC=2:2:6).
Additive: 3 wt % of fluoroethylene carbonate (FEC) and 1.0 wt % of the compound represented by Chemical Formula 1-b (provided that "wt %" in the electrolyte composition is based on 100 wt % of the total electrolyte (lithium salt+non-aqueous organic solvent+additive)

Example 2

A lithium secondary battery cell was manufactured in the same manner as in Example 1 except that the content of the compound represented by Chemical Formula 1-b was changed into 0.5 wt %.

Example 3

A lithium secondary battery cell was manufactured in the same manner as in Example 1 except that the content of the compound represented by Chemical Formula 1-b was changed into 1.5 wt %.

Comparative Example 1

A lithium secondary battery cell was manufactured in the same manner as in Example 1 except that the compound represented by Chemical Formula 1-b was not used.

Comparative Example 2

A lithium secondary battery cell was manufactured in the same manner as in Example 1 except that the compound represented by Chemical Formula 6 with a linear phosphone-based functional group rather than the cyclic phosphone-based functional group was used instead of the compound represented by Chemical Formula 1-b among the additives in Example 1.

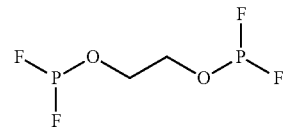

[Chemical Formula 6]

Evaluation of Characteristics of Battery Cells
Evaluation 1: Evaluation of Resistance Increase Rate after High-Temperature Storage Each lithium secondary battery cell according to Examples 1 to 3 and Comparative Examples 1 and 2 was left for 50 days in a state of charge (SOC=100%) at 60° C. and then, evaluated with respect to an internal resistance increase rate when left at a high temperature (60° C.), and the results are shown in Table 1.

DC-IR (Direct Current Internal Resistance) was measured in the following method.

The cells of Examples 1 to 3 and Comparative Examples 1 and 2 were charged at 4 A to 4.2 V at room temperature (25° C.), cut off at 100 mA, and paused for 30 minutes. Subsequently, the cells were respectively discharged at 10 A for 10 seconds, at 1 A for 10 seconds, and at 10 A for 4 seconds and then, measured with respect to a current and a voltage at 18 seconds and 23 seconds to calculate initial resistance (difference between resistance at 18 seconds and resistance at 23 seconds) according to ΔR=ΔV/ΔI.

Figure 2:
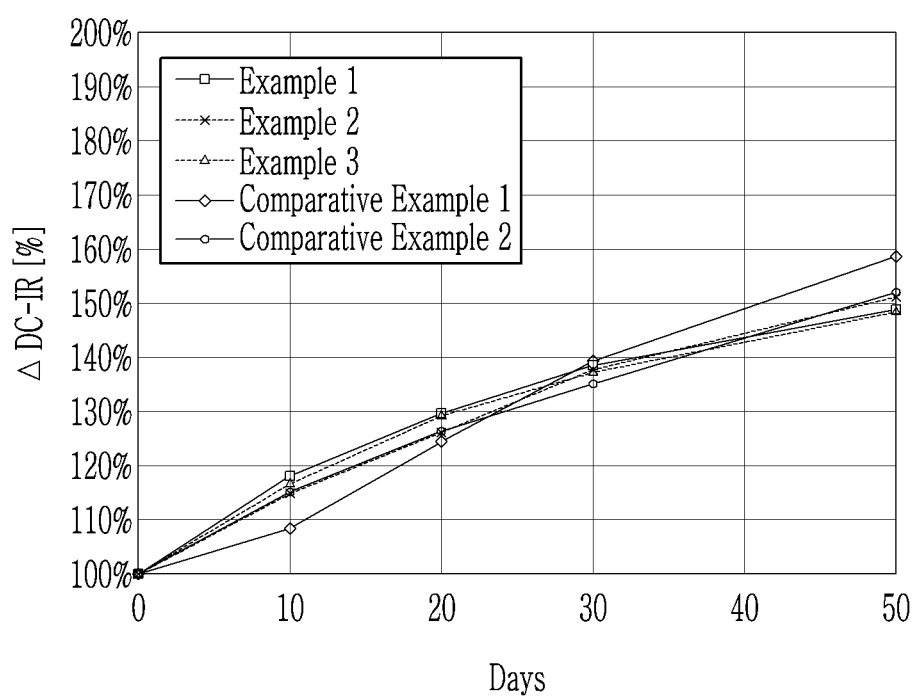
FIG. 2 is a graph showing an increase rate of internal resistance of lithium secondary battery cells manufactured according to Examples 1 to 3 and Comparative Examples 1 and 2 when left at a high temperature (60° C.).

The cells were allowed to stand under charge conditions of 0.2 C and 4.2 V at 60° C. for 50 days and then, measured with respect to DC-IR, which was used to calculate a resistance increase rate before and after left according to Equation 1, and the results are shown in Table 1 and FIG. 2.

Resistance increase rate=[DC-IR after leaving for 50 days/initial DC-IR]×100                    <Equation 1>

TABLE 1

|  | Initial DC-IR (mOhm) | 60° C., 50 days DC-IR (mOhm) | Δ DC-IR (%) |
|---|---|---|---|
| Example 1 | 18.77 | 27.94 | 149 |
| Example 2 | 19.05 | 28.86 | 151 |
| Example 3 | 18.76 | 27.87 | 149 |
| Comparative Example 1 | 19.14 | 30.37 | 159 |
| Comparative Example 2 | 19.07 | 28.99 | 152 |

Referring to Table 1, the secondary battery cells pf Examples 1 to 3 exhibited much lower resistance increase rates before and after left at a high temperature, compared with those of Comparative Examples 1 and 2.

Accordingly, the secondary battery cells of Example 1 to 3 exhibited improved high-temperature stability, compared with those of Comparative Examples 1 and 2.

Figure 3:
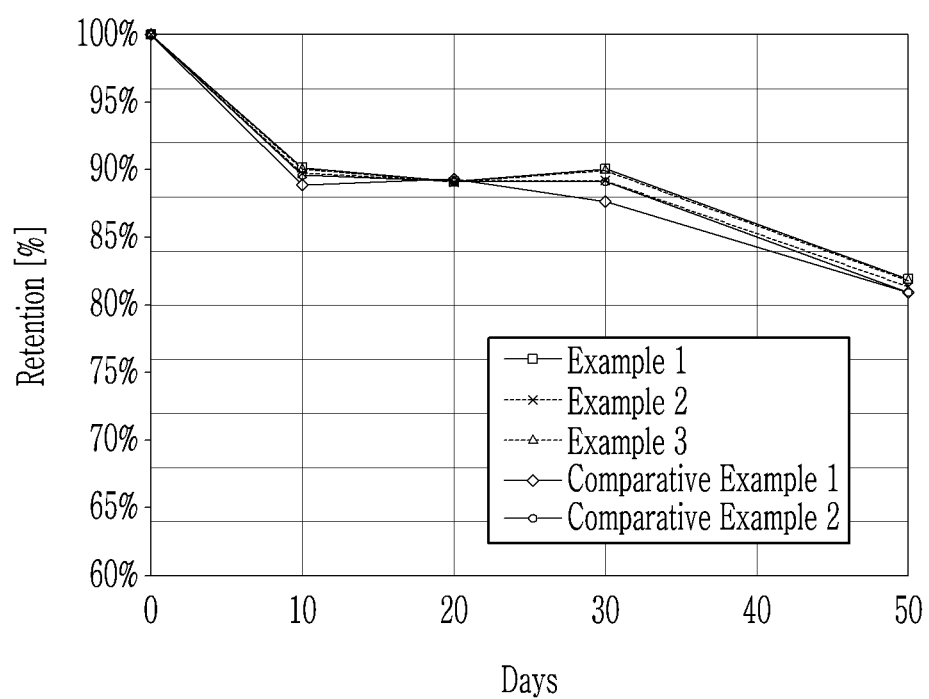
FIG. 3 is a graph showing capacity retention rates of lithium secondary battery cells manufactured according to Examples 1 to 3 and Comparative Examples 1 and 2 when left at a high temperature (60° C.).
Figure 4:
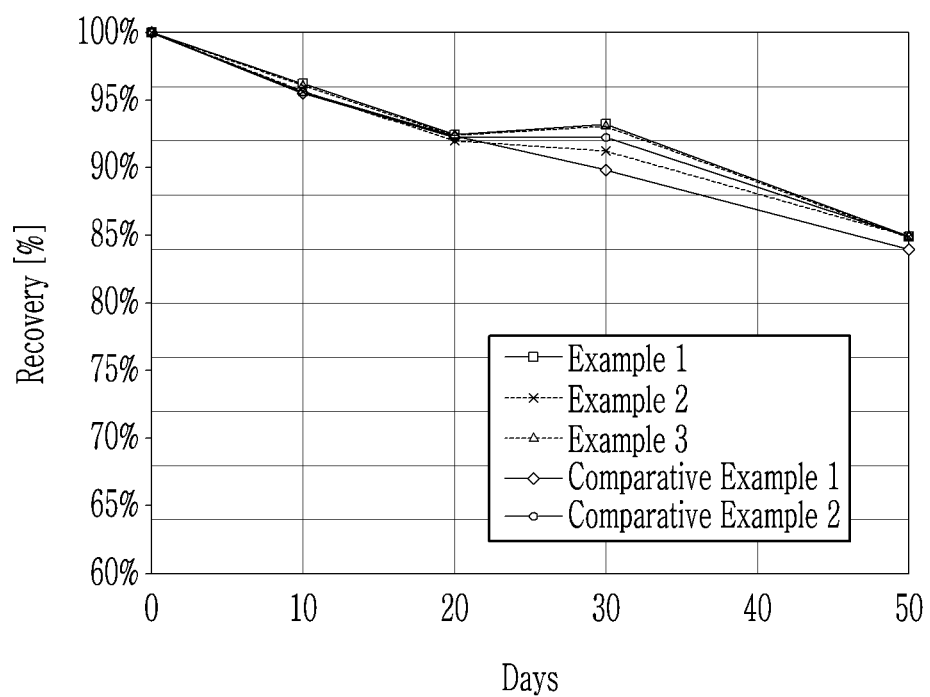
FIG. 4 is a graph showing the capacity recovery rate of lithium secondary batteries prepared according to Examples 1 to 3 and Comparative Examples 1 and 2 when left at a high temperature (60° C.).

Evaluation 2: Evaluation of Capacity Retention Rate and Capacity Recovery Rate after High-Temperature Storage Each lithium secondary battery cell according to Examples 1 to 3 and Comparative Examples 1 and 2 was left at 60° C. in a state of charge (SOC=100%) for 50 days and then, evaluated with respect to a capacity retention rate and a capacity recovery rate, when left at a high temperature (60° C.), and the results are shown in Table 2 and FIGS. 3 and 4.

The capacity retention rate was calculated according to Equation 2, and the results are shown in Table 2.

Capacity retention rate (%)=(1st discharge capacity after leaving for 50 days/initial discharge capacity)×100  <Equation 2>

The capacity recovery rate was calculated according to Equation 3, and the results are shown in Table 2.

Capacity recovery rate (%)=(2nd discharge capacity after leaving for 50 days/initial discharge capacity)×100  <Equation 3>

TABLE 2

|  | Initial discharge capacity (mAh) | 1st discharge capacity after leaving for 50 days (mAh) | 2nd discharge capacity after leaving for 50 days (mAh) | Capacity retention rate (%) | Capacity recovery rate (%) |
|---|---|---|---|---|---|
| Example 1 | 2505 | 2054 | 2129 | 82 | 85 |
| Example 2 | 2519 | 2053 | 2143 | 82 | 85 |
| Example 3 | 2506 | 2055 | 2128 | 82 | 85 |
| Comparative Example 1 | 2520 | 2041 | 2117 | 81 | 84 |
| Comparative Example 2 | 2519 | 2040 | 2141 | 81 | 85 |

Referring to Table 2, the lithium secondary battery cells of Examples 1 to 3 exhibited much more excellent capacity retention rates after left for 50 days, compared with those of Comparative Examples 1 and 2 and in addition, more excellent capacity recovery rates after left for 50 days, compared with that of Comparative Example 1. In other words, the lithium secondary battery cells of Examples 1 to 3 exhibited excellent high-temperature stability and cycle-life characteristics, compared to those of the comparative examples.

Evaluation 3: LSV Characteristic Evaluation

For the electrolytes according to Example 1 and Comparative Examples 1 and 2, the oxidation electrode decomposition was evaluated using a linear sweep voltammetry (LSV) at 25° C. In the measurement, a three-electrode electrochemical cell using a Cu electrode as a working electrode and Li as a counter electrode and a reference electrode was used.

Figure 5:
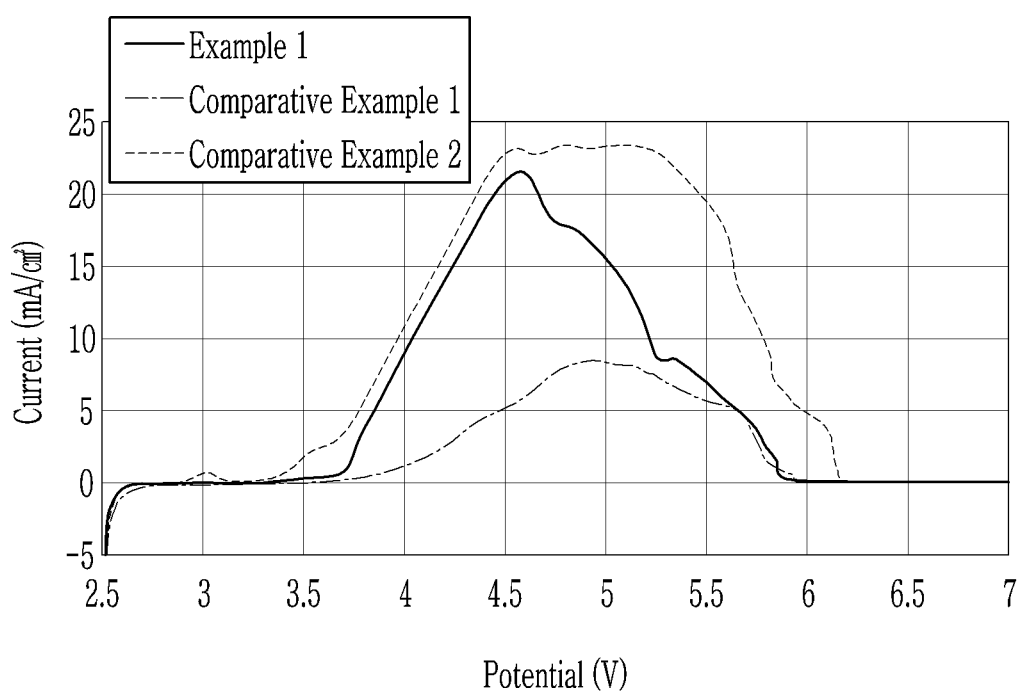
FIG. 5 is a graph showing linear sweep voltammetry (LSV) evaluation results for lithium secondary electrolytes according to Example 1 and Comparative Examples 1 and 2.

Herein, scanning was performed at a rate of 1 mV/sec in the range of 2.5 V to 7.0 V, and the results are shown in FIG. 5.

Referring to FIG. 5, the electrolyte of Example 1 had an active polymerization reaction at a Cu electrode, but the electrolytes of Comparative Examples 1 and 2 had almost no polymerization reaction at the Cu electrode.

Accordingly, the electrolyte of Example 1, compared with the electrolytes of Comparative Examples 1 and 2, had the polymerization reaction on the surface of the Cu electrode and thus prevented formation of Cu-containing impurities, improving a cell defect rate.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An electrolyte for a lithium secondary battery, comprising
  a non-aqueous organic solvent;
  a lithium salt; and
  an additive represented by Chemical Formula 1:

[Chemical Formula 1]

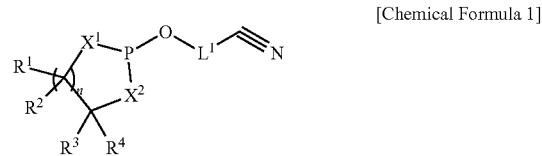

wherein, in Chemical Formula 1,
  $X^1$ and $X^2$ are each independently O, S, $CR^aR^b$, or $NR^c$, provided that at least one of $X^1$ and $X^2$ is O or S,
  $L^1$ is a substituted or unsubstituted C1 to C10 alkylene group or a substituted or unsubstituted C2 to C10 alkenylene group,
  $R^1$ to $R^4$ are each independently hydrogen, a C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C6 to C20 an aryl group, or a combination thereof, and
  n is an integer of any one of 1 to 3.

2. The electrolyte of claim 1, wherein
the compound represented by Chemical Formula 1 is represented by Chemical Formula 1A:

[Chemical Formula 1A]

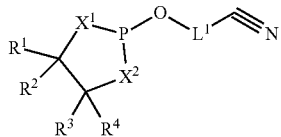

wherein, in Chemical Formula 1A,
the definitions of $X^1$, $X^2$, $L^1$, and $R^1$ to $R^4$ are the same as in claim 1.

3. The electrolyte of claim 1, wherein
the compound represented by Chemical Formula 1 is represented by any one of Chemical Formula 1-1 to Chemical Formula 1-3:

[Chemical Formula 1-1]

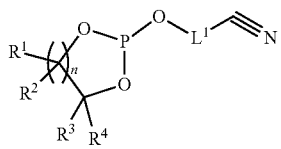

[Chemical Formula 1-2]

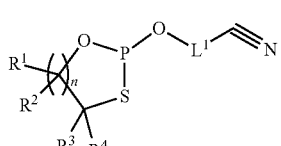

[Chemical Formula 1-3]

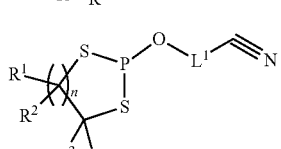

wherein, in Chemical Formula 1-1 to Chemical Formula 1-3,
the definitions of $L^1$, $R^1$ to $R^4$, and n are the same as in claim 1.

4. The electrolyte of claim 1, wherein
$R^1$ to $R^4$ are each independently hydrogen, a C1 to C6 alkyl group, a substituted or unsubstituted C1 to C6 alkoxy group, a substituted or unsubstituted C2 to C6 alkenyl group, a substituted or unsubstituted C3 to C6 cycloalkyl group, a substituted or unsubstituted C3 to C6 cycloalkenyl group, a substituted or unsubstituted C6 to C10 an aryl group, or a combination thereof.

5. The electrolyte of claim 1, wherein
$L^1$ is a substituted or unsubstituted C1 to C6 alkylene group.

6. The electrolyte of claim 1, wherein
the compound represented by Chemical Formula 1 is represented by any one of Chemical Formula 1-a to Chemical Formula 1-r:

[1-a]

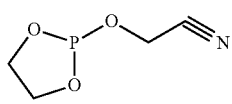

[1-b]

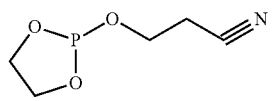

[1-c]

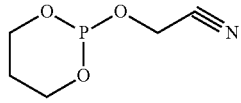

[1-d]

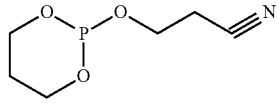

[1-e]

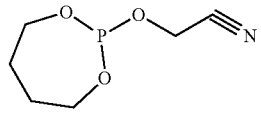

[1-f]

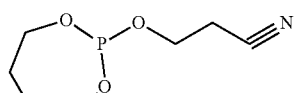

[1-g]

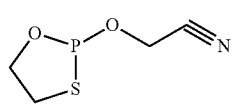

[1-h]

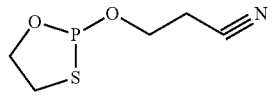

[1-i]

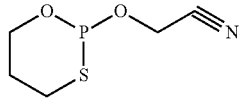

[1-j]

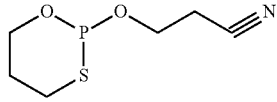

[1-k]

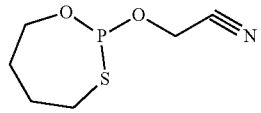

[1-l]

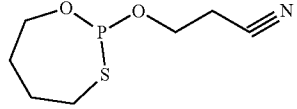

[1-m]

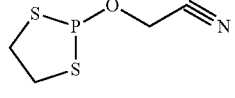

[1-n]

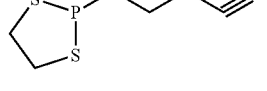

-continued

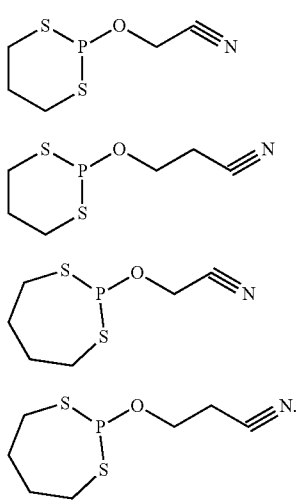

[1-o]

[1-p]

[1-q]

[1-r]

7. The electrolyte of claim 1, wherein
the compound represented by Chemical Formula 1 is included in an amount of 0.1 wt % to 10 wt % based on the total amount of the electrolyte for a lithium secondary battery.

8. The electrolyte of claim 1, wherein
the compound represented by Chemical Formula 1 is included in an amount of 0.1 wt % to 3.0 wt % based on the total amount of the electrolyte for a lithium secondary battery.

9. A lithium secondary battery, comprising
a positive electrode including a positive active material;
a negative electrode including an anode active material; and
the electrolyte of claim 1.

10. The lithium secondary battery of claim 9, wherein
the positive active material includes at least one of a composite oxide of lithium and a metal selected from cobalt, manganese, nickel, and a combination thereof.

11. The lithium secondary battery of claim 9, wherein
the positive active material is represented by Chemical Formula 2:

$Li_aNi_{x1}CO_{y1}M_{z1}O_2$ [Chemical Formula 2]

wherein, in Chemical Formula 2,
$0.9 \leq a \leq 1.8$, $0.5 < x1 \leq 1$, $0 < y1 \leq 0.5$, $0 < z1 \leq 0.5$, $x1+y1+z1=1$, and M is Ni, Co, Mn, Al, Ti, Mg, Zr, Ca, Nb, Fe, P, F, B, or a combination thereof.

* * * * *